Patented Mar. 20, 1945

2,371,652

UNITED STATES PATENT OFFICE 2,371,652

COATING COMPOSITIONS

Fritz Rostler and Leopold Bornstein, Wilmington, Del., assignors to Wilmington Chemical Corporation, Wilmington, Del., a corporation of Delaware No Drawing. Application May 29, 1941, Serial No. 395,878. In Germany May 30, 1938

7 Claims. (Cl. 106—265)

This invention or discovery relates to coating compositions; and it comprises new and improved coating compositions having the property of drying in the air to form useful films, said compositions containing, as an essential ingredient, certain unsaturated hydrocarbon compounds of high viscosity and high molecular complexity, as indicated by low iodine numbers, these hydrocarbon compounds being obtainable from waste products of the petroleum refining industry, including petroleum acid sludges and residues of extraction with various selective solvents; and it comprises methods of producing these coating compositions; all as more fully hereinafter set forth and as claimed.

This application contains subject matter common to prior and copending application filed August 31, 1938, now Patent No. 2,247,411, and is a continuation-in-part of application Serial No. 377,268, filed February 3, 1941.

As stated in the acknowledged applications, it has been found that certain raw materials which are obtainable from the waste products of petroleum refining processes are adapted to take part in condensation reactions of the type resulting in the formation of synthetic resins. These materials are essentially hydrocarbons, as indicated by numerous analyses showing compositions closely approximating 90 per cent carbon and 10 per cent hydrogen. They are complex in structure and weakly unsaturated, as indicated by low iodine numbers, which are characteristically on the order of 20 to 60, and by high molecular weights, which are usually from 300 to 1000. Their composition may be indicated empirically by the formula $(C_3H_4)n$, with $n$ usually having a value in the range from 7 to 25. These unsaturated hydrocarbon materials are much more viscous than the normal petroleum oils from which they are separated during the refining treatment. They generally have the appearance of a reddish-brown, greenly fluorescent oil or of a slightly fluid resin.

This unsaturated hydrocarbon material is also characterized by solubility in nearly all organic solvents, and by substantial solubility in strong sulfuric acids, including concentrated acid and fuming acid. It is generally not reactive with dilute reagents, but it reacts with many concentrated reagents. It is capable of an extensive reaction with sulfur which is similar to caoutchouc vulcanization. It is also capable of nitration and, as stated, of polymerization and co-condensation with the ingredients of various types of synthetic resins, especially with the constituents of the various phenol-aldehyde resins.

As starting materials for the recovery of these mildly unsaturated hydrocarbons, there may be used the well-known acid sludges which are formed in the refining of mineral oil products with sulfuric acid, or the residues obtained in the refining of mineral oil products with known selective solvents, including furfural, phenol, cresol, dichlor-diethyl ether, and mixtures of liquid $SO_2$ with various organic solvents including benzol. Useful procedures for recovering the desired unsaturated hydrocarbon materials are disclosed in considerable detail elsewhere. For example, U. S. Patents Nos. 2,185,951, 2,185,952, and 2,217,918, which issued from applications copending with the acknowledged application, Serial No. 227,862, describe and claim various methods of obtaining the desired unsaturated hydrocarbon materials from acid sludges and from the residues of solvent refining. The hydrocarbons are also described in considerable detail, and claimed, in U. S. Patent 2,217,919. Briefly stated, these hydrocarbon materials are generally obtained by distillation under vacuum of solvent extract residues or the organic constituents of acid sludges or selected portions thereof. This distillation is generally effected in the presence of alkaline reagents or after thorough neutralization of the starting material with alkali, and the recovered material generally has a boiling range between 150° and 380° C. at an absolute pressure of 12 mm. Hg. Usually the material is recovered in fractions having narrower boiling ranges. The desired unsaturated hydrocarbon product sometimes carries with it some neutral oil, or saturated petroleum hydrocarbons, carried forward from the refining step.

As also disclosed in the acknowledged applications, it is possible, and generally advantageous, to incorporate these predominantly unsaturated hydrocarbon materials, and mixtures thereof obtained from the waste products of oil refining, in plastic compositions, including lacquers, varnishes, synthetic resins, molding powders and other molding materials, including laminated articles. Compositions are thus obtained which are capable of heat-hardening or oven-drying, even when containing large proportions of these new materials. These unsaturated hydrocarbon materials may be incorporated in synthetic resin compositions and condensation products, especially those of a heat-hardening or thermo-setting character, in any of various ways; and in general, the inclusion of these novel hydrocarbon materials constitutes a substantial improvement on the previously available synthetic resins. In particular, many of the technical properties of such compositions are markedly improved by the inclusion of these hydrocarbons. However, it has been found that in some instances, the resins and other plastic compositions produced in the manner described have a cloudy appearance or an oily surface. The varnishes and lacquers produced from these condensates also sometimes have the disadvantage of permitting separation of oil during storage; and laminated articles produced with such varnishes have sometimes developed an oily surface. The physical and chemical properties are not generally affected by this change, but the oiliness, etc., are sometimes annoying, in that they cause the finished product to catch dust, or make it unpleasant to handle.

It has now been established, as stated in the acknowledged application Serial No. 377,268, that these occasional undesirable results are caused by the presence of saturated hydrocarbons or oils, which sometimes accompany the desired unsaturated hydrocarbons produced from the waste materials of mineral oil refining. Saturated petroleum hydrocarbons are generally not compatible with synthetic resins and lacquers; and it is because of this incompatibility that separation of oils and cloudiness of resins are sometimes encountered when, in the operations previously described, excessive amounts of saturated hydrocarbons are carried into the condensation products, etc., with the unsaturated hydrocarbon materials desired in accordance with the invention.

It has been found that these difficulties can be completely eliminated, or avoided, by observing certain precautions. These precautions are based on the discovery that condensates containing the desirable unsaturated hydrocarbons previously described, and varnishes or other solutions made therefrom, can only tolerate the presence of certain rather definite amounts of saturated unreactive hydrocarbons; and that the limit of this tolerance or compatibility is dependent upon (1) the nature of the other constituents of the condensate; and (2) the amount of the unsaturated hydrocarbon material, described hereinabove, which is present. This tolerance can also be modified (that is, increased) to some extent by the presence of certain other materials in the condensates or in the varnishes made therefrom.

We have also found that generally similar considerations apply to the utilization of these unsaturated hydrocarbon materials in air drying compositions, including paints, varnishes, lacquers, enamels, etc. We have found that when these hydrocarbons are properly prepared and selected, and combined with minor amounts of suitable siccatives, they dry in air at atmospheric temperatures (that is, without baking) to form useful films; and that they may be employed advantageously as substantial constituents of many previously known air drying compositions containing resins, oils, etc.

In more detail, we have now found that the previously described essentially unsaturated hydrocarbon material which is obtained from waste products of mineral oil refining consists essentially of three parts; and we have found that these three parts have different reactivities. These parts may be designated (1) the first soluble fraction; (2) the second soluble fraction; and (3) the insoluble fraction. Of these, the first soluble fraction is soluble in ordinary concentrated sulfuric acid (e. g. 98 per cent). The second soluble fraction is not soluble in concentrated sulfuric acid, but is soluble in fuming sulfuric acid (e. g. containing 20 to 30 per cent excess $SO_3$). The third or insoluble fraction is not soluble in either concentrated or fuming sulfuric acid. It is often a saturated oily unreactive hydrocarbon material which is generally similar to the "white oil" sometimes produced from petroleum for medicinal and other purposes.

The proportions in which these three constituents are present in hydrocarbon materials obtained from petroleum waste products, as described hereinabove, have a very definite effect on the applicability of the hydrocarbon materials in the synthetic resin and coating arts. Fortunately, it is generally possible to select or prepare fractions of the hydrocarbon mixtures having the desired proportions of the three constitutents; and it is always possible to determine these proportions without difficulty. This determination is made by first treating the hydrocarbon mixture obtained from acid sludge or solvent extract residue with sulfuric acid having a concentration of about 98 per cent. This separates the first soluble fraction; that is, the acid dissolves this fraction and the acid solution separates from the undissolved hydrocarbons. The remaining part of the original material is separated from the first solution and is then treated with fuming sulfuric acid containing from 20 to 30 per cent of excess $SO_3$. This acts on the second soluble fraction and causes it to separate, usually as a second solution, which is removed. The remaining part of the original material is the saturated unreactive portion designated the insoluble fraction, which ordinarily consists of white oil, or solid paraffin or both. For most purposes, this saturated hydrocarbon material of the insoluble fraction is an impurity in the desired unsaturated material of the first and second soluble fractions. However, it causes no difficulty with condensation products or coating compositions, if its ratio to the soluble fractions is not too high.

We have found that the proportions of the three stated constituents, in the hydrocarbon materials as obtained from petroleum waste products, vary considerably. In a typical hydrocarbon mixture, obtained from acid sludge, there was 80 per cent of the first soluble fraction, 10 per cent of the second soluble fraction, and 10 per cent of white oil (the insoluble fraction). Another hydrocarbon mixture obtained from solvent extract residues contained 50 per cent of the first soluble fraction, 40 per cent of the second soluble fraction and 10 per cent of white oil. It should be understood that these are merely typical proportions, and that the actual proportions may vary widely in individual cases. For example, the insoluble fraction may constitute 30 per cent or more of the total hydrocarbon mixture as recovered from petroleum waste products, unless care is taken to minimize it, in which case it may be only 5 per cent or less.

The determination of the composition of any of these hydrocarbon mixtures, in terms of the three constituents just described, is often desirable, in that it gives considerable additional information as to the character of the materials present. For example, both of the mixtures previously mentioned (obtained from acid sludge and from solvent extract residues, respectively) had iodine numbers of 42 and were generally similar in appearance. However, the first soluble fraction of the product obtained from acid sludge (amounting to 80 per cent of the total, as previously noted) had an iodine number of 52, as compared with an iodine number of 72 for the first soluble fraction (50 per cent) of the material obtained from solvent extract residue. The second soluble fractions had iodine numbers of 15 and 12, respectively, while the iodine number of the white oil was, in both cases, zero.

Unsaturated hydrocarbon materials of the type described hereinabove, which are useful in condensation products and other plastic compositions, including air drying coating compositions, are available commercially under the name of "Naftolen." These hydrocarbons are available in several grades, differing in viscosity and boiling point range, and in the proportions of the three constituents; namely, the first and second soluble fractions and the insoluble fraction.

We have found that "Naftolen" compounds and similar hydrocarbon materials can be used successfully in air drying lacquers, etc., if the white oil content (insoluble fraction) is not too high. White oil and similar saturated hydrocarbons have no drying properties, and their presence in unsaturated hydrocarbon compositions, such as "Naftolen," impairs the drying properties of coating materials containing it. This impairment of drying properties increases with the amount of saturated hydrocarbons present, and for best results the unsaturated hydrocarbons employed in accordance with this invention should contain a minimum of saturated hydrocarbons (insoluble fraction) and at least about 84 per cent of the said first and second soluble fractions. Advantageously, the insoluble fraction does not exceed about 8 per cent, and 4 per cent or less is preferable.

When this precaution is observed, the unsaturated hydrocarbon materials employed in accordance with this invention will dry at room temperature in the presence of minor amounts of siccative compounds, within two to four days, and sometimes in considerably less time, especially when the white oil content is negligible in amount. All of the usual siccatives can be employed, when using these hydrocarbons alone and in various combinations, to produce air dried films; suitable siccatives including compounds of cobalt, manganese, lead and vanadium, such as naphthenates, oleates, linoleates, etc. When these unsaturated hydrocarbons are used with highly reactive phenolic resins, the drying time in air at atmospheric temperature decreases substantially. Also, quick drying compositions can be prepared from these hydrocarbons and various drying and semi-drying oils. For example, the drying of a lacquer containing these hydrocarbons in admixture with drying oils and driers often takes place in a few hours.

Substantially all types of resins produce good air drying compositions when combined with substantial proportions of the described unsaturated hydrocarbons. Among the resins which have been found suitable for this purpose are straight phenolic resins of the oil-soluble type, modified phenolic resins, alkyd (glyptal) resins and modified alkyd resins, chlorinated rubber, and natural resins including dammar and rosin. The hydrocarbons employed in accordance with this invention can easily be combined with these resins. It is also easy to combine these hydrocarbons with all of the drying oils, semi-drying oils and non-drying oils, including China-wood oil, linseed oil, oiticica oil, soy bean oil, dehydrated castor oil, etc. Coating compositions containing these hydrocarbons can be diluted with substantially all commercial solvents.

The proportion in which the unsaturated hydrocarbons are employed, based on the drying oil, or resin, or both, which may be present, depends on the purpose for which the lacquer, varnish, or other coating compositions is being prepared. In varnishes containing resins, the hydrocarbons and drying oil can be present in substantially equal amounts. On the basis of previously known formulations for lacquers and varnishes, the described hydrocarbons can replace 40 to 70 per cent of the drying oil, and up to 30 per cent of the resin; and this generally results in an improvement in the lacquers and varnishes. In many instances, much larger proportions of the constituents of previously known formulations can be replaced with benefit by these hydrocarbons.

In addition to the use of these unsaturated hydrocarbons, such as "Naftolen," to supplement or replace the drying oil or resin or parts of both in air drying varnishes, they may also be used advantageously as modifying agents in the resin itself. In that case, the hydrocarbons are incorporated during the manufacture of the resins, such as oil soluble synthetic resins of the phenolic or alkyd type, and they improve the oil solubility of the resins in which they are incorporated. Suitable procedures for incorporating these hydrocarbons in resins are described in the applications previously acknowledged.

In a general way, these hydrocarbons improve the quality of varnishes, lacquers and paints, particularly with regard to resistance to weather, water and various chemical and corrosive influences. These hydrocarbons often make it possible to substitute cheaper materials for those previously used. For example, combinations of these hydrocarbons with linseed oil produce films which are even more waterproof than those obtained by the use of China-wood oil (without the hydrocarbons) in similar formulations.

These hydrocarbons can be used in unpigmented transparent coatings and also for pigmented coatings. They are compatible with all pigments and have a good wetting power for pigments.

Coating compositions containing these hydrocarbons have many applications. Among these, it is noted that such compositions are highly suitable for industrial usage in the protection of machinery and parts thereof, especially in chemical plants; for the protection of iron structural work, such as bridges and the like; and for the protection of wood against corrosive atmospheric conditions. Since these hydrocarbons are not saponifiable, compositions containing them are well adapted for use in protecting underlying surfaces from attack by water, acid, alkali and atmospheric conditions. These hydrocarbons can also be used advantageously as plasticizers in lacquers and similar coating compositions having a base of chlorinated rubber, in which non-saponifiable plasticizers are often required or desirable.

While these hydrocarbons can be used in various coating compositions containing either drying oils or resins, they are usually found most advantageous in compositions containing both drying oils and resins. A film of these hydrocarbons when used alone is intermediate in properties between a soft oil film and a hard brittle resin film. In combination coatings, the hydrocarbons substitute for, and supplement the properties of, both the drying oil and the resin. It is often desirable to reduce the drying oil content of such compositions to a very small amount, merely sufficient to plasticize the film.

The following examples illustrate some useful embodiments of this invention:

Example 1

100 parts by weight of oiticica oil and
100 parts by weight of Naftolen hydrocarbons produced from centrifuged acid sludge, according to U. S. Patent No. 2,185,951, with a boiling range between 250 to 325° C. at 12 mm Hg, having an iodine number of 60 and a mean molecular weight of 340, consisting of 70 parts soluble in 98% sulfuric acid and 23 parts soluble in 30% oleum, was heated to 120° C. for 20 minutes;
160 parts by weight of Teglac Z-152 (a modified alkyd type resin modified with drying oil and having a melting range of 130° to 150° C. and an acid number of 25 to 40, produced by American Cyanamid Corporation) were slowly added while increasing the temperature to 200° C. over 50 minutes. The temperature was increased after this time to 295° C. and this temperature was maintained for 1 hour. After this time
55 parts by weight of stand oil were added. The temperature was decreased to 250° C. for 90 minutes. After cooling to 120° C. the varnish was reduced by
300 parts by weight of white spirits.

The resulting varnish can be used as an air drying finish, or as a baked varnish. In air drying compositions, a small amount of siccative, such as 0.5 part of lead drier and 0.2 part of cobalt drier (by weight) is added. Other drying oils can be substituted for oiticica oil, and the ratio of drying oil to Naftolen can be modified, as by substaituting additional Naftolen hydrocarbons for part of the oil. When this is done, 10 parts of stand oil should be added and 10 parts of resin eliminated for each additional 50 parts of the hydrocarbons included in this formula. For example, the above formula can be modified as follows:

| | Parts by weight |
|---|---|
| Oiticica oil | 50 |
| Naftolen (as described above) | 150 |
| Stand oil | 65 |
| Teglac Z-152 | 150 |

Example 2

150 parts by weight of soya bean oil and
100 parts by weight of Naftolen hydrocarbons, produced by the process of U. S. Patent No. 2,217,918, with a boiling range from 220 to 280° C. at 12 mm Hg, having an iodine number of 40 and a mean molecular weight of 300, consisting of 45 parts concentrated sulfuric acid soluble and 50 parts oleum soluble, were heated to 260° C., and
150 parts by weight of Amberol M-88 (a modified phenol-formaldehyde resin modified with natural resins and having a melting range from 100° to 150° C. and an acid number of 10 to 20, produced by the Resinous Products and Chemical Co., Inc.) were added over a period of about one hour. The temperature was increased to 280° C. At this temperature
30 parts by weight of stand oil were added and the temperature of 280° C. was maintained for 35 minutes. After cooling,
250 parts by weight of white spirits were added. The siccative used with this formulation was
2 parts by weight of lead drier
1.5 parts by weight of cobalt drier, and
0.7 parts by weight of manganese drier.

Example 3

100 parts by weight of oiticica oil
100 parts by weight of Naftolen (as described in Example 1)
100 parts by weight of amylophenol resin (produced from para tertiary amyl phenol)
45 parts by weight of stand oil
300 parts by weight of white spirits, and
0.7 parts by weight of cobalt drier were made into a useful air drying varnish by the procedure of Example 1.

Example 4

145 parts by weight of perilla oil were heated at 120° C. with
125 parts by weight of Naftolen (as described in Example 1).
125 parts by weight of Amberol F-7 (a modified phenolic resin modified with natural resins and having a melting range of 100 to 150° C. and an acid number of 10 to 20) were slowly added. While the resin was being added the temperature was increased to 200° C., which took about 40 minutes. After all the resin was dissolved the varnish was heated for two hours at 290° C. and after cooling to about 120° C. was reduced with
250 parts by weight of white spirits. A siccative comprising
3.1 parts by weight of lead drier and
1.7 parts by weight of cobalt drier was added.

Example 5

52 parts by weight of China-wood oil and
32 parts by weight of Naftolen (as described in Example 2) were heated to 150° C.
128 parts by weight of Amberol F-7 were added and the mixture heated to 280° C. for two hours. After cooling
160 parts by weight of white spirits and
5 parts by weight of cobalt drier were added.

Example 6

60 parts by weight of China-wood oil
140 parts by weight of Naftolen (as described in Example 1) and
40 parts by weight of linseed oil were heated at 300° C. for 30 minutes.
100 parts by weight of Amberol BS-1 (modified with natural resins and having a melting range of 100° to 150° C. and an acid number of 10 to 20) were added and the mixture was heated again to 300° C. for 15 minutes.
40 parts by weight of linseed oil were added again and after cooling
400 parts by weight of white spirits and
7 parts by weight of cobalt drier.

This varnish, as well as those in the preceding examples, have many utilities, especially for indoor uses.

Example 7

100 lbs. of tung oil
80 lbs. of Naftolen hydrocarbons containing 50 per cent of first soluble fraction and 42 per cent of second soluble fraction.
100 lbs. of Arochem 130 resin (manufactured by Strook & Wittenberg and consisting of a modified phenolic resin having a melting range of 100° to 150° C. and an acid number of from 10 to 20)
200 lbs. of Shell solvent TS-1 (a petroleum hydrocarbon solvent)
3 lbs. of Nuodex lead drier (lead naphthenate)
1 lb. of Nuodex cobalt drier (cobalt naphthenate)
0.6 lbs. of Nuodex manganese drier The resin and tung oil are heated for 25 minutes at 232° C. and then Naftolen is added. After continuing the heating for five more minutes the varnish is finished and reduced with solvent, and the siccative is added.

Example 8

200 lbs. tung oil
200 lbs. Naftolen hydrocarbons containing 70 per cent of first soluble fraction and 30 per cent of second soluble fraction.
100 lbs. Arochem 130
100 lbs. Shell solvent TS-1
6 lbs. Nuodex lead drier
4 lbs. Nuodex cobalt drier This varnish is made in exactly the same way as the varnish in Example 7. Both these varnishes can be used as spar and floor varnishes.

Example 9

100 lbs. linseed oil—stand oil.
50 lbs. Naftolen hydrocarbons containing 60 per cent of first soluble fraction and 24 per cent of second soluble fraction.
150 lbs. Beckacite 1113 (either pure phenolic or modified phenolic resins manufactured by Reichhold Chemicals, Inc.)
150 lbs. Shell Solvent TS-1
3 lbs. Nuodex cobalt drier
3 lbs. Nuodex lead drier This varnish is made exactly as the varnish in Example 7, with the exception that the heating time is 2 hours. This varnish is particularly suitable as floor varnish or spar varnish.

Example 10

128 lbs. tung oil
32 lbs. perilla oil
80 lbs. Naftolen hydrocarbons containing 65 per cent of first soluble fraction and 29 per cent of second soluble fraction
160 lbs. Bakelite resin XR-254 (a phenyl phenol-formaldehyde resin)
460 lbs. Shell solvent TS-28 (a petroleum hydrocarbon solvent having a boiling range of 160 to 195° C. and a 6.1 aniline point)

The resin, together with the tung oil and perilla oil is heated at 232° C. until a viscosity between "E" and "F" on the Gardner-Holdt scale is reached, which takes about twenty minutes. This varnish can be used as a very flexible, oven drying varninsh, adapted for cans, and is also useful as a spar varnish and floor varnish. The drying time depends on the purpose for which the varnish is used, and on the drying conditions. It can be dried, for instance, in 13 minutes at from 200 to 205° C. It is advisable to add a trace of cobalt drier to prevent surface stickiness after drying.

Example 11

100 lbs. chlorinated rubber, and
50 lbs. Naftolen hydrocarbons containing 65 parts of first soluble fraction and 30 parts second soluble fraction are dissolved in
200 lbs. toluene at room temperature.

This lacquer has excellent adhesion, water resistance and elasticity.

As stated hereinabove and in the acknowledged application Serial No. 377,268, the quantity of white oil (insoluble fraction) which can be tolerated in coating compositions containing the desired unsaturated hydrocarbons depends, to some extent, on the nature of the other constituents present. In general, the amount of white oil should not exceed 16 per cent of the total hydrocarbons, and should be less than 8 per cent if the optimum results are to be obtained in air drying compositions. When the insoluble fraction is paraffin instead of white oil, the tolerance is substantially lower, but is readily determined in the same way. Since the saturated unreactive petroleum hydrocarbons are not generally compatible with, or useful in, air drying compositions, it may be considered that, from one viewpoint, our invention comprises a method of incorporating in air drying coating compositions saturated hydrocarbon materials which are not normally compatible therewith; this generally being effected without detriment to the properties of the coating compositions, and generally resulting in products having improved characteristics.

The unsaturated hydrocarbon materials used in the foregoing examples were produced from acid sludge and from the residues of solvent extract refining of mineral lubricating oils. In order to reduce the white oil content of these hydrocarbons to the desired range, the acid sludge used as a starting material in some cases was centrifuged, sometimes in the presence of a diluting agent such as fuel oil, prior to processing in accordance with the procedures previously mentioned. The hydrocarbons derived from solvent extracts were selected from fractions having the desired contents of first and second acid soluble portions. In selecting these fractions, it is merely necessary to fractionate a sample of an unsaturated hydrocarbon mixture produced as described heretofore, and to test the fractions to ascertain their contents of first and second soluble portions and insoluble portions. With this information, the main body of the hydrocarbon mixture is fractionated to obtain products having the desired composition. Another method involves re-extraction with selective solvents of the crude extracts or the crude "Naftolen" hydrocarbons.

The term "air drying coating composition" is used in the present specification and claims in the sense and meaning which it ordinarily has in the present art. More specifically this term means coating compositions which dry by taking on oxygen from the air and accordingly which include a siccative having the function of a catalyst and an oxygen carrier. Such compositions are to be distinguished from the compositions disclosed in the Patent No. 2,247,411 which harden by polymerization and condensation, under the influence of heat.

It should be understood that our invention is not limited to the foregoing examples, but may be variously practiced and embodied within the scope of the appended claims.

What we claim is:

1. An air drying coating composition comprising a substantial portion of the hydrocarbons derived from waste products of mineral oil refining and having characteristics substantially identical with those of the products composed of approximately 90 per cent carbon and 10 per cent hydrogen, which are obtained by neutralizing petroleum acid sludge and fractionating the organic constituents thereof under vacuum to eliminate at least the portions boiling outside of the range from 160° to 360° C. at 12 mm. Hg absolute pressure, said hydrocarbons containing a small proportion of saturated hydrocarbon which would not normally be compatible with the non-hydrocarbon constituents of the air drying coating composition but being rendered compatible by the presence of at least 84 per cent unsaturated compounds based upon the total hydrocarbons in the said hydrocarbon mixture, said composition also containing a siccative and at least one other film-forming constituent from the class consisting of drying oils and resins, said film forming constituents and said hydrocarbons being proportioned to form a coating capable of drying in air at atmospheric temperature.

2. The composition of claim 1, in which said added film-forming constituent is linseed oil.

3. The composition of claim 1, wherein said added film-forming constituent is an oil soluble phenol-formaldehyde resin.

4. The composition of claim 1, wherein said added film-forming constituent is chlorinated rubber.

5. The composition of claim 1, to which is added a solvent for said hydrocarbons and said other constituent.

6. The composition of claim 1 wherein said unsaturated hydrocarbons are present in a proportion at least 92 per cent based upon the total hydrocarbons present.

7. The composition of claim 1 wherein said unsaturated hydrocarbons are present in a proportion at least 96 per cent based upon the total hydrocarbons present.

FRITZ ROSTLER.
LEOPOLD BORNSTEIN.